(12) United States Patent
Prasad et al.

(10) Patent No.: US 10,996,876 B2
(45) Date of Patent: May 4, 2021

(54) SYSTEMS AND METHODS FOR DYNAMICALLY MODIFYING MEMORY NAMESPACE ALLOCATION BASED ON MEMORY ATTRIBUTES AND APPLICATION REQUIREMENTS

(71) Applicant: Dell Products L.P., Round Rock, TX (US)

(72) Inventors: Parmeshwr Prasad, Bengaluru (IN); Yogesh P. Kulkarni, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 100 days.

(21) Appl. No.: 15/712,409

(22) Filed: Sep. 22, 2017

(65) Prior Publication Data

US 2019/0095114 A1 Mar. 28, 2019

(51) Int. Cl.
*G06F 3/06* (2006.01)
*G06F 11/07* (2006.01)

(52) U.S. Cl.
CPC .......... *G06F 3/0631* (2013.01); *G06F 3/061* (2013.01); *G06F 3/0619* (2013.01); *G06F 3/0646* (2013.01); *G06F 3/0649* (2013.01); *G06F 3/0685* (2013.01); *G06F 11/07* (2013.01)

(58) Field of Classification Search
None
See application file for complete search history.

(56) References Cited

U.S. PATENT DOCUMENTS

| 2007/0185902 | A1* | 8/2007 | Messinger | G06F 3/0619 |
| 2009/0300238 | A1* | 12/2009 | Panabaker | G06F 3/0605 710/62 |
| 2018/0260158 | A1* | 9/2018 | Marripudi | G06F 11/3034 |
| 2018/0329790 | A1* | 11/2018 | Prasad | G06F 11/073 |

OTHER PUBLICATIONS

Intel, NVDIMM Namespace Specification, Apr. 2015, Intel Corporation, Revision 1.0, pp. 1-20 (Year: 2015).*

* cited by examiner

*Primary Examiner* — Charles Rones
*Assistant Examiner* — Jonah C Kreiger
(74) *Attorney, Agent, or Firm* — Jackson Walker L.L.P.

(57) ABSTRACT

In accordance with embodiments of the present disclosure, an information handling system may include a processor, a memory communicatively coupled to the processor, and an allocation agent embodied in a program of executable instructions and configured to, when executed by the processor, maintain an attribute index setting forth one or more attributes for each of one or more memory modules of the memory, and based on the one or more attributes and one or more memory requirements of an application executing on the information handling system, dynamically allocate the one or more memory modules to a namespace associated with the application.

20 Claims, 2 Drawing Sheets

SYSTEMS AND METHODS FOR DYNAMICALLY MODIFYING MEMORY NAMESPACE ALLOCATION BASED ON MEMORY ATTRIBUTES AND APPLICATION REQUIREMENTS

TECHNICAL FIELD

The present disclosure relates in general to information handling systems, and more particularly to systems and methods for dynamically modifying memory namespace allocation based on memory attributes and application requirements.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are increasingly using persistent memory technologies such as Non-Volatile Dual In-line Memory Modules (NVDIMMs). An NVDIMM is a memory module that may retain data even when electrical power is removed either from an unexpected power loss, system crash or from a normal system shutdown. To enable such functionality, an NVDIMM may include a traditional dynamic random access memory (DRAM) which may store data during normal operation when electrical power is available from a power supply unit and a flash memory to back up data present in the DRAM when a loss of electrical power from the power supply unit occurs. A battery, capacitor, or other energy storage device either internal or external to the NVDIMM may supply electrical energy for a "save" operation to transfer data from the DRAM to the flash memory in response to a power loss event from the power supply unit.

NVDIMMs may require tens of seconds to minutes of time to copy from DRAM memory to flash memory. Such time may vary with NVDIMM capacity, organization, supplier, error correction code modes, encryption settings, or state-of-wear leveling. Successful data movement between DRAM memory and flash memory may not be guaranteed in all cases. In addition, existing approaches to NVDIMMs do not provide efficient mechanisms for prioritizing namespace allocation within NVDIMMs based on requirements of applications utilizing NVDIMMs, meaning using existing approaches, successful movement of critical data prior to non-critical data may not be guaranteed in all cases.

SUMMARY

In accordance with the teachings of the present disclosure, the disadvantages and problems associated with existing approaches to performing save operations to a persistent memory of an information handling system may be reduced or eliminated.

In accordance with embodiments of the present disclosure, an information handling system may include a processor, a memory communicatively coupled to the processor, and an allocation agent embodied in a program of executable instructions and configured to, when executed by the processor, maintain an attribute index setting forth one or more attributes for each of one or more memory modules of the memory, and based on the one or more attributes and one or more memory requirements of an application executing on the information handling system, dynamically allocate the one or more memory modules to a namespace associated with the application.

In accordance with these and other embodiments of the present disclosure, a method may include maintaining an attribute index setting forth one or more attributes for each of one or more memory modules of a memory of an information handling system and based on the one or more attributes and one or more memory requirements of an application executing on the information handling system, dynamically allocating the one or more memory modules to a namespace associated with the application.

In accordance with these and other embodiments of the present disclosure, an article of manufacture may include a non-transitory computer-readable medium and computer-executable instructions carried on the computer-readable medium, the instructions readable by a processor, the instructions, when read and executed, for causing the processor to maintain an attribute index setting forth one or more attributes for each of one or more memory modules of a memory of an information handling system, and based on the one or more attributes and one or more memory requirements of an application executing on the information handling system, dynamically allocate the one or more memory modules to a namespace associated with the application.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
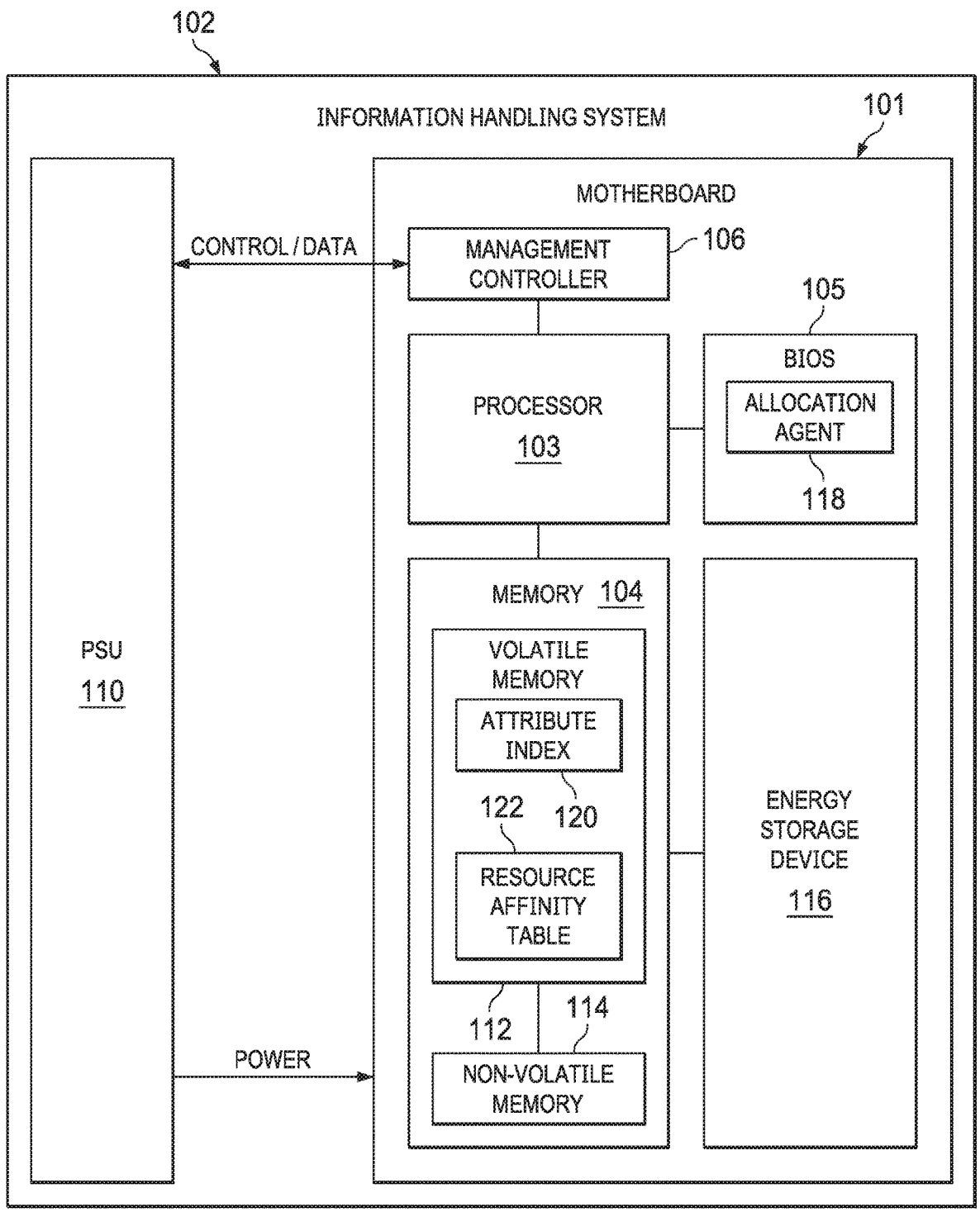
FIG. 1 illustrates a block diagram of an example information handling system, in accordance with embodiments of the present disclosure.
Figure 2:
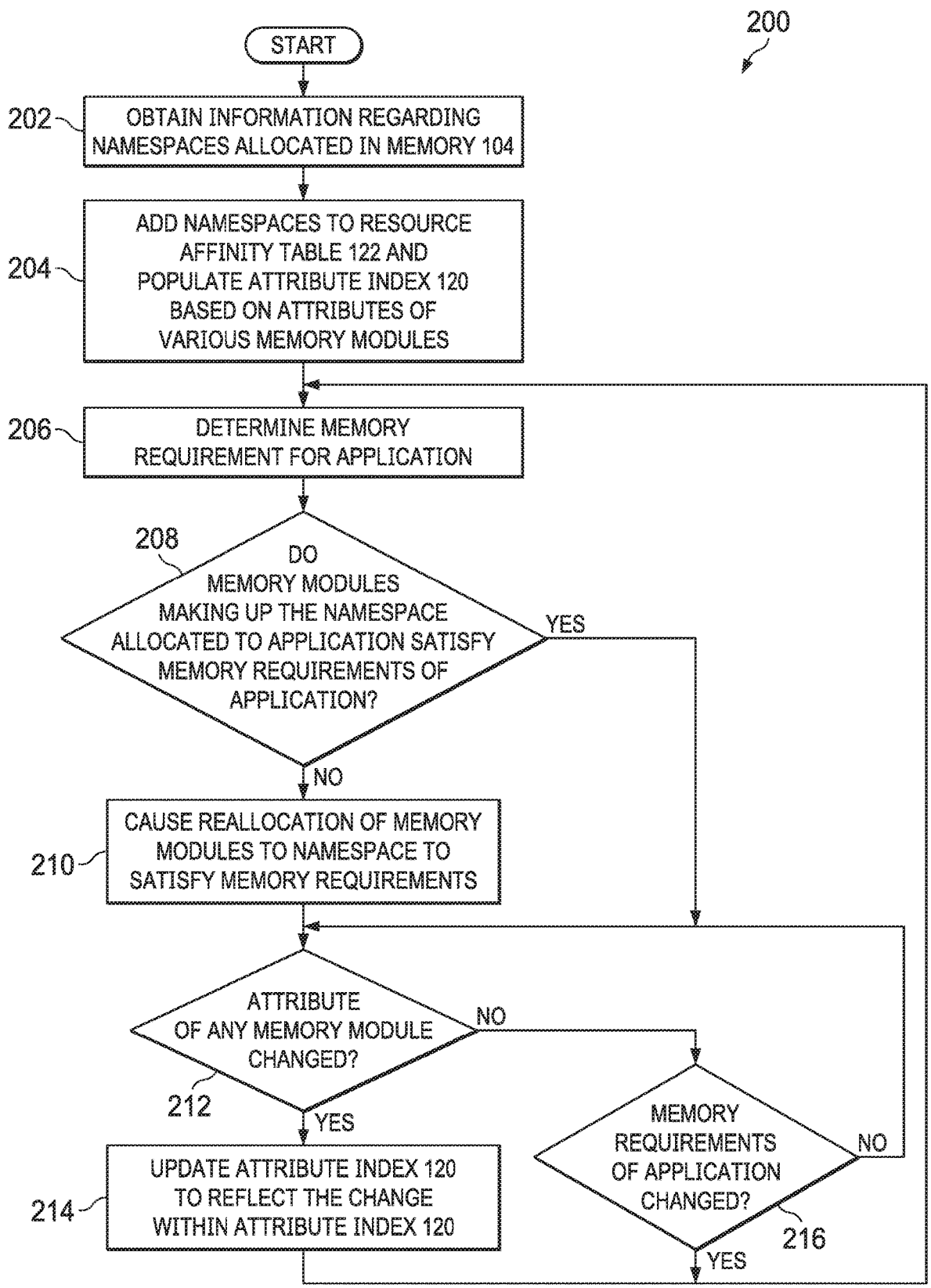
FIG. 2 illustrates a flow chart of an example method for dynamically modifying memory namespace allocation

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal data assistant (PDA), a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, power supplies, air movers (e.g., fans and blowers) and/or any other components and/or elements of an information handling system.

FIG. 1 illustrates a block diagram of an example of an information handling system 102. As depicted, information handling system 102 may include a power supply unit (PSU) 110, a motherboard 101, and one or more other information handling resources.

Motherboard 101 may include a circuit board configured to provide structural support for one or more information handling resources of information handling system 102 and/or electrically couple one or more of such information handling resources to each other and/or to other electric or electronic components external to information handling system 102. As shown in FIG. 1, motherboard 101 may include a processor 103, memory 104, a BIOS 105, a management controller 106, an energy storage device 116, and one or more other information handling resources.

Processor 103 may comprise any system, device, or apparatus operable to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may comprise any system, device, or apparatus operable to retain program instructions or data for a period of time. Memory 104 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 102 is turned off. As shown in FIG. 1, memory 104 may comprise a persistent memory (e.g., comprising one or more NVDIMMs) that includes a volatile memory 112 (e.g., DRAM or other volatile random-access memory) and non-volatile memory 114 (e.g., flash memory or other non-volatile memory). During normal operation, when PSU 110 provides adequate power to components of information handling system 102, data written to memory 104 from processor 103 may be stored in volatile memory 112. However, in the event of loss of system input power or a power fault of PSU 110 that prevents delivery of electrical energy from PSU 110 to memory 104, data stored in volatile memory 112 may be transferred to non-volatile memory 114 in a save operation. After input power is restored, or a faulty PSU 110 is replaced, such that PSU 110 is again operable to provide electrical energy to information handling resources of information handling system 102, on the subsequent power-on of information handling system 102, data may be copied from the non-volatile memory 114 back to volatile memory 112 via a restore operation. The combined actions of data save and then data restore, allow the data to remain persistent through a power disruption. Accordingly, although not explicitly shown in FIG. 1, memory 104 may also include hardware, firmware, and/or software for carrying out save operations.

Although not shown in FIG. 1, one or more namespaces may be allocated within memory 104. For instance, in accordance with the NVDIMM Namespace Specification, namespaces may be either a persistent memory namespace, which is a byte-addressable namespace, or a block namespace, which is a block-addressable namespace. A persistent memory may include one or both types of namespaces allocated therein. As per the NVDIMM Namespace Specification, a persistent memory namespace is interleaved across a plurality (e.g., two) of memory modules (e.g., NVDIMMs), and an interleaved set of modules may include at most one persistent memory namespace. Also in accordance with the NVDIMM Namespace Specification, a block namespace is associated with only a single memory module (e.g., NVDIMM).

A BIOS 105 may include any system, device, or apparatus configured to identify, test, and/or initialize information handling resources of information handling system 102, and/or initialize interoperation of information handling system 102 with other information handling systems. "BIOS"

may broadly refer to any system, device, or apparatus configured to perform such functionality, including without limitation, a Unified Extensible Firmware Interface (UEFI). In some embodiments, BIOS 105 may be implemented as a program of instructions that may be read by and executed on processor 103 to carry out the functionality of BIOS 105. In these and other embodiments, BIOS 105 may comprise boot firmware configured to be the first code executed by processor 103 when information handling system 102 is booted and/or powered on. As part of its initialization functionality, code for BIOS 105 may be configured to set components of information handling system 102 into a known state, so that one or more applications (e.g., an operating system or other application programs) stored on compatible media (e.g., disk drives) may be executed by processor 103 and given control of information handling system 102. In some embodiments, BIOS 105 may also be configured to, alone or in concert with management controller 106, perform timing characterization for save operations in memory 104, as described in greater detail below.

As shown in FIG. 1, BIOS 105 may include allocation agent 118. Allocation agent 118 may include any program of instructions executable by processor 103 and configured to, when executed, maintain an attribute index 120 relating to features of various namespaces of memory 104 and based on the attribute index and requirements of applications using the various namespaces, dynamically allocate namespaces among the memory resources (e.g., DIMMs) of memory 104, as described in greater detail below. Although FIG. 1 shows allocation agent 118 embodied within BIOS 105, in some embodiments, all or a portion of allocation agent 118 may be embodied by firmware integral to memory 104 and/or all or a portion of allocation agent 118 may be implemented within an operating system executing on processor 103.

Management controller 106 may be configured to provide out-of-band management facilities for management of information handling system 102. Such management may be made by management controller 106 even if information handling system 102 is powered off or powered to a standby state. Management controller 106 may include a processor, memory, an out-of-band network interface separate from and physically isolated from an in-band network interface of information handling system 102, and/or other embedded information handling resources. In certain embodiments, management controller 106 may include or may be an integral part of a baseboard management controller (BMC) or a remote access controller (e.g., a Dell Remote Access Controller or Integrated Dell Remote Access Controller). In other embodiments, management controller 106 may include or may be an integral part of a chassis management controller (CMC). In some embodiments, management controller 106 may be configured to communicate with a PSU 110 to communicate control and/or telemetry data between management controller 106 and PSU 110. For example, PSU 110 may communicate information regarding status and/or health of PSU 110 and/or measurements of electrical parameters (e.g., electrical currents or voltages) present within PSU 110. In some embodiments, management controller 106 may also be configured to, alone or in concert with BIOS 105, perform timing characterization for save operations in memory 104, as described in greater detail below.

Generally speaking, PSU 110 may include any system, device, or apparatus configured to supply electrical current to one or more information handling resources of information handling system 102.

Energy storage device 116 may comprise any system, device, or apparatus configured to store energy which may be used by memory 104 to perform save operations in response to a loss of system input power source (e.g., alternating current input source) or power fault of PSU 110. In some embodiments, energy storage device 116 may comprise a battery configured to convert stored chemical energy into electrical energy. In other embodiments, energy storage device 116 may comprise a capacitor or "supercap" configured to store electrical energy and deliver such electrical energy to memory 104 when needed to perform save operations (e.g., by closure of a switch to electrically couple such capacitor to components of memory 104). In yet other embodiments, energy storage device 116 may comprise a power supply external to memory 104. Although energy storage device 116 is shown in FIG. 1 as external to memory 104, in some embodiments energy storage device 116 may be integral to memory 104. In these and other embodiments, energy storage device 116 may be charged from PSU 110. In some embodiments, energy storage device 116 may be communicatively coupled to management controller 106 via a systems management interface such as, for example, Inter-Integrated Circuit (i2C), System Management Bus (SMBus) or Power Management Bus (PMBus), allowing management controller 106 to receive health and status (e.g., state of charge) from and/or communicate commands to energy storage device 116. In some embodiments, energy storage device 116 may provide energy to a plurality of persistent memory 104 devices.

In addition to motherboard 101, processor 103, memory 104, BIOS 105, management controller 106, energy storage device 116, and PSU 110, information handling system 102 may include one or more other information handling resources. For example, in some embodiments, information handling system 102 may include more than one PSU 110 and/or more than one energy storage device 116.

In operation, allocation agent 118 (or another component of information handling system 102) may be configured to maintain attribute index 120. Attribute index 120 may include a map, table, matrix, list, database, or any other suitable data structure that may store one or more attributes associated with the various memory modules (e.g., NVDIMMs) making up memory 104. For example, attribute index 120 may include, for each memory module (e.g. NVDIMM), one or more parameters including, without limitation, memory side cache information, memory hit information, memory miss information, memory bandwidth information (read and/or write bandwidth), memory latency (read and/or write latency), and memory hierarchy level. In some embodiments, attribute index 120 may include, for each memory module (e.g. NVDIMM), an attribute score which may be calculated by allocation agent 118 based on the various attributes for the memory module. Thus, a higher attribute score may indicate a memory module that may more efficiently perform a save operation while a lower attribute score may indicate a memory module with a lower efficiency for performing a save operation.

Also in operation, allocation agent 118 (or another component of information handling system 102) may be configured to maintain affinity table 122. Affinity table 122 may include a map, table, matrix, list, database, or any other suitable data structure that may store a mapping and/or allocation of individual namespaces to physical memory modules (e.g., NVDIMMs), including the memory ranges of the memory modules to which the namespaces are mapped. Further in operation, allocation agent 118 (or another component of information handling system 102) may be configured to dynamically modify allocation of namespaces to memory modules of memory 104 based on memory attributes, as defined by attribute index 120, and memory requirements of one or more applications executing on processor 103, as set forth in greater detail below.

FIG. 2 illustrates a flow chart of an example method 200 for dynamically modifying memory namespace allocation based on memory attributes and application requirements, in accordance with embodiments of the present disclosure. According to some embodiments, method 200 may begin at step 202. As noted above, teachings of the present disclosure may be implemented in a variety of configurations of information handling system 102. As such, the preferred initialization point for method 200 and the order of the steps comprising method 200 may depend on the implementation chosen.

At step 202, allocation agent 118 may obtain information regarding namespaces allocated in memory 104. At step 204, allocation agent 118 may add all namespaces to resource affinity table 122 and populate attribute index 120 based on the attributes of the various memory modules.

At step 206, allocation agent 118 may determine a memory requirement for an application executing on processor 103. For example, a memory requirement may define a criticality of the application's data or a priority of the application's data with respect to other applications. At step 208, allocation agent 118 may, based on information of attribute index 120, determine if the memory modules making up the namespace allocated to the application satisfy the memory requirements of the application. If the memory requirements are satisfied, method 200 may proceed to step 212. Otherwise, if the memory requirements are not satisfied, method 200 may proceed to step 210.

At step 210, responsive to the memory requirements of the application not being satisfied by memory modules of the namespace, allocation agent 118 may cause reallocation of memory modules to the namespace in order to satisfy the memory requirements. For example, for an interleaved persistent memory namespace, allocation agent 118 may reallocate one or more of the memory modules of the namespace. As another example, for a block namespace, allocation agent 118 may reallocate the block namespace to another memory module. When reallocating memory modules within namespaces, allocation agent 118 may also update resource affinity table 122 accordingly.

At step 212, allocation agent 118 may determine if an attribute of any memory module of memory 104 has changed. If an attribute has changed, method 200 may proceed to step 214. If no attributes have changed, method 200 may proceed to step 216.

At step 214, in response to a change of a memory attribute, allocation agent 118 may update attribute index 120 to reflect the change within attribute index 120. After completion of step 214, method 200 may proceed again to step 206.

At step 216, allocation agent 118 may determine if memory requirements of an application have changed. If memory requirements of an application have changed, method 200 may proceed again to step 206. Otherwise, if memory requirements of the application have not changed, method 200 may proceed again to step 212.

Although FIG. 2 discloses a particular number of steps to be taken with respect to method 200, method 200 may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented using information handling system 102 or any other system operable to implement method 200. In certain embodiments, method 200 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system comprising:
a motherboard including a central processing unit (CPU);
a memory coupled to the CPU by a first bus, wherein the memory includes one or more memory modules;
a BIOS coupled to the CPU by a second bus, wherein the BIOS includes allocation agent instructions, executable by the CPU, wherein the allocation agent instructions, when executed by the CPU, cause the CPU to perform namespace allocation operations, wherein the namespace allocation operations include:
maintaining information indicative of one or more memory modules allocated to a particular namespace;
maintaining an attribute index indicative of one or more attributes of the one or more memory modules allocated to the particular namespace;
determining a memory requirement for an application program associated with the particular namespace;
responsive to determining that one or more memory modules allocated to the particular namespace do not satisfy the memory requirement, dynamically reallocating memory modules to the particular namespace to obtain reallocated memory modules, wherein the reallocated memory modules satisfy the memory requirement; and responsive to detecting that a particular attribute of the reallocated memory modules differs from the particular attribute of previously allocated memory modules, updating the attribute index.

2. The information handling system of claim 1, wherein the one or more memory modules comprise one or more persistent memory modules, each persistent memory module comprising volatile memory and non-volatile memory.

3. The information handling system of claim 2, wherein the one or more attributes for a particular memory module are indicative of an efficiency of the particular memory module for performing a save operation from the volatile memory of the particular memory module to the non-volatile memory of the particular memory module.

4. The information handling system of claim 1, wherein the one or more attributes include at least one of memory side cache information, memory hit information, memory miss information, memory bandwidth information, memory latency information, memory hierarchy level information, and an attribute score.

5. The information handling system of claim 1, wherein the allocation agent instructions are further configured to maintain a resource affinity table defining allocations of memory modules to namespaces and dynamically update the resource affinity table responsive to dynamically allocating the one or more memory modules to the namespace.

6. The information handling system of claim 1, wherein the allocation agent instructions are further configured to dynamically allocate the one or more memory modules to the namespace associated with the application by reallocating the one or more memory modules responsive to the one or more attributes failing to satisfy the one or more memory requirements of the application.

7. The information handling system of claim 1, wherein the allocation agent instructions are further configured to, responsive to a change in the one or more memory requirements or a change in the one or more attributes:
  determine if the one or more memory requirements are satisfied by the one or more attributes; and
  reallocate the one or more modules responsive to the one or more attributes failing to satisfy the one or more memory requirements of the application.

8. The information handling system of claim 1, wherein the allocation agent instructions are further configured to dynamically allocate the one or more memory modules to a namespace associated with the application by reallocating a subject namespace from a portion of a memory module to another portion of the memory module or to another memory module.

9. A method comprising:
  maintaining, by a central processing unit of an information handling system, information indicative of one or more memory modules allocated to a particular namespace;
  maintaining an attribute index indicative of one or more attributes of the one or more memory modules allocated to the particular namespace;
  determining a memory requirement for an application program associated with the particular namespace;
  responsive to determining that one or more memory modules allocated to the particular namespace do not satisfy the memory requirement, dynamically reallocating memory modules to the particular namespace to obtain reallocated memory modules, wherein the reallocated memory modules satisfy the memory requirement; and
  responsive to detecting that a particular attribute of the reallocated memory modules differs from the particular attribute of previously allocated memory modules, updating the attribute index.

10. The method of claim 9, wherein the one or more memory modules comprise one or more persistent memory modules, each persistent memory module comprising volatile memory and non-volatile memory.

11. The method of claim 10, wherein the one or more attributes for a particular memory module are indicative of an efficiency of the particular memory module for performing a save operation from the volatile memory of the particular memory module to the non-volatile memory of the particular memory module.

12. The method of claim 9, wherein the one or more attributes include at least one of memory side cache information, memory hit information, memory miss information, memory bandwidth information, memory latency information, memory hierarchy level information, and an attribute score.

13. The method of claim 9, further comprising maintaining a resource affinity table defining allocations of memory modules to namespaces and dynamically updating the resource affinity table responsive to dynamically allocating the one or more memory modules to the namespace.

14. The method of claim 9, further comprising dynamically allocating the one or more memory modules to the namespace associated with the application by reallocating the one or more memory modules responsive to the one or more attributes failing to satisfy the one or more memory requirements of the application.

15. The method of claim 9, further comprising, responsive to a change in the one or more memory requirements or a change in the one or more attributes:
  determining if the one or more memory requirements are satisfied by the one or more attributes; and
  reallocating the one or more memory modules responsive to the one or more attributes failing to satisfy the one or more memory requirements of the application.

16. The method of claim 9, wherein dynamically allocating the one or more memory modules to a namespace associated with the application by reallocating a subject namespace from a portion of a memory module to another portion of the memory module or to another memory module.

17. An article of manufacture, comprising:
  a non-transitory computer-readable medium; and
  computer-executable instructions carried on the computer-readable medium, the instructions readable by a central processing unit, the instructions, when read and executed, for causing the processor perform operations including:
    maintaining information indicative of one or more memory modules allocated to a particular namespace;
    maintaining an attribute index indicative of one or more attributes of the one or more memory modules allocated to the particular namespace;
    determining a memory requirement for an application program associated with the particular namespace;
    responsive to determining that one or more memory modules allocated to the particular namespace do not satisfy the memory requirement, dynamically reallocating memory modules to the particular namespace to obtain reallocated memory modules, wherein the reallocated memory modules satisfy the memory requirement; and responsive to detecting that a particular attribute of the reallocated memory modules differs from the particular attribute of previously allocated memory modules, updating the attribute index.

18. The article of claim 17, wherein the one or more memory modules comprise one or more persistent memory modules, each persistent memory module comprising volatile memory and non-volatile memory.

19. The article of claim 18, wherein the one or more attributes for a particular memory module are indicative of an efficiency of the particular memory module for performing a save operation from the volatile memory of the particular memory module to the non-volatile memory of the particular memory module.

20. The article of claim 17, wherein the one or more attributes include at least one of memory side cache information, memory hit information, memory miss information, memory bandwidth information, memory latency information, memory hierarchy level information, and an attribute score.

* * * * *